United States Patent
Mullarkey et al.

(10) Patent No.: US 10,067,812 B2
(45) Date of Patent: Sep. 4, 2018

(54) PRESENTING DIAGNOSTIC HEADLINES USING SIMPLE LINGUISTIC TERMS

(71) Applicant: CA, Inc., New York, NY (US)

(72) Inventors: Peter William Mullarkey, Fort Collins, CO (US); Kevin Eugene Davis, Cibolo, TX (US); Michael Charles Johns, Austin, TX (US)

(73) Assignee: CA, Inc., New York, NY (US)

(*) Notice: Subject to any disclaimer, the term of this patent is extended or adjusted under 35 U.S.C. 154(b) by 172 days.

(21) Appl. No.: 14/673,251

(22) Filed: Mar. 30, 2015

(65) Prior Publication Data
US 2016/0292026 A1    Oct. 6, 2016

(51) Int. Cl.
*G06F 11/00* (2006.01)
*G06F 11/07* (2006.01)
*G06F 11/32* (2006.01)

(52) U.S. Cl.
CPC ........ *G06F 11/079* (2013.01); *G06F 11/0748* (2013.01); *G06F 11/0754* (2013.01); *G06F 11/0793* (2013.01); *G06F 11/32* (2013.01)

(58) Field of Classification Search
CPC ............... G06F 11/079; G06F 11/0793; G06F 11/3065; G06F 11/3086
See application file for complete search history.

(56) References Cited

U.S. PATENT DOCUMENTS

| | | | |
|---|---|---|---|
| 6,473,659 B1* | 10/2002 | Shah | G06F 11/2242 382/141 |
| 7,191,364 B2 | 3/2007 | Hudson et al. | |
| 7,203,624 B2 | 4/2007 | Warshawsky | |
| 8,000,935 B2 | 8/2011 | Logan | |
| 2006/0010258 A1* | 1/2006 | Zare | G06F 11/3604 710/1 |
| 2006/0167866 A1* | 7/2006 | Farchi | G06F 11/3604 |
| 2008/0250497 A1* | 10/2008 | Mullarkey | H04L 41/142 726/22 |
| 2008/0301076 A1* | 12/2008 | Timmins | G06Q 10/06 706/46 |
| 2010/0070462 A1* | 3/2010 | Wada | G06F 11/0709 707/603 |
| 2015/0199148 A1* | 7/2015 | Hrischuk | G06F 3/0653 711/114 |

* cited by examiner

*Primary Examiner* — Philip A Guyton
(74) *Attorney, Agent, or Firm* — Baker Botts L.L.P.

(57) ABSTRACT

A method for a diagnostic headline system using simple linguistic terms is described. The method comprises receiving historical and current performance data for a component of a system. An anomaly is determined in the current performance data by comparing the current performance data and the historical performance data for the component. The anomaly is determined whether or not it indicates an error in the system. The cause of the anomaly is determined. Steps for addressing the cause of the anomaly are recommended. A display is formatted of the current performance data, the error, and the recommended steps for addressing the cause of the anomaly.

17 Claims, 9 Drawing Sheets

| SOURCE | PRIMARY INDICATORS | OBS | TREND | SECONDARY INDICATORS | OBS | TREND |
|---|---|---|---|---|---|---|
| NETWORK | COMPONENTS: NRTT | △ | ▽ | TRAFFIC: VOLUME/RATE | | |
| NETWORK | SESSIONS: NETWORK CONNECTION TIME | △ | ▽ | QoS: SERVER BURSTINESS | | |
| NETWORK | COMPONENTS: RETRANSMISSION TIME | △ | ▽ | SESSIONS: TCP/IP SESSION COUNTS | | |
| SERVER | COMPONENTS: SERVER RESPONSE TIME | △ | △ | SESSIONS: UNRESPONSIVE/REFUSED CONNECTIONS | | △ |
| SERVER | SESSIONS: SERVER CONNECTION TIME | △ | △ | SESSIONS: TCP/IP SESSION COUNTS | | △ |
| SERVER | | | | TRAFFIC: VOLUME/RATE | | △ |
| SERVER | | ▽ | ▽ | QoS: SERVER BURSTINESS | | △ |
| APPLICATION | COMPONENTS: DATA TRANSFER TIME | | | QoS: SERVER BURSTINESS | | |
| APPLICATION | RESPONSE SIZE: DATA TRANSFER BY SIZE | | | TRAFFIC: VOLUME/RATE | | |
| APPLICATION | | | | SESSIONS: TCP/IP SESSION COUNTS/TIMES | | |

FIG. 3

| Reports | Maps | Analysis | Items | Admin | | Help|Sign Out (Search) |
|---|---|---|---|---|---|---|
| | | | | | | 🖨PRINT ✉EMAIL MORE▾ |

HL Incidents: Group / All Groups [change]

Custom ▾ [▾] 17 May 2010 11:10 - 17 May 2010 13:10 CDT [▾] [▾]

Headlines for Server with Incidents

| Headline ▽ | 2010-05-17 11:10 - 2010-05-17 13:10 CDT |
|---|---|
| | Comment |
| A server incident issue happened for ad1.net.qos.local at 5/17/2010 5:00:00 PM and had no known probable cause. | Add Comment |
| A server incident happened for ad1.net.qos.local at 5/17/2010 11:35:00 PM and probable causes are Resource taxation determined by refused/unresponsive/total sessions with likelihood [1.10] and | Add Comment |
| Server resource severely taxed, SuperAgent is monitoring the responsible application. Resource taxation due to increased load (evidenced by increased total sessions) with likelihood [0.82] | Add Comment |

1 of 1                                     Max Per Page: [10]▾

FIG. 5

| Reports | Maps | Analysis | Items | Admin | | Help | Sign Out | ( Search 🔍 ) |

HL Incidents Group: / All Groups [change]
Last Hour ▼ | ▼ 25 May 2010 09:03 – 25 May 2010 10:03 CDT ▲ | ▼
🖶 PRINT ✉ EMAIL MORE ▼

Headlines for Server with Incidents                                    2010-05-25 09:05 – 2010-05-25 10:05 CDT
Headline ▼
A server incident issue happened for SUPSA82DISTPLAM at 5/25/10 2:30:00 PM and was supported by server response time and server total sessions and refinement was provided by server memory utilization. The following indicators were checked and provided no date [server refused sessions and server Cpu utilization and server Nic utilization].

1 of 1                                                            Max Per Page: 10 ▼

Headline Details for Server SUPSA82DISTPLAM triggered by ServersWithIncident        2010-05-17 09:10 – 2010-05-17 10:10 CDT

| Server Name | Date of Issue | Trigger Metric | Secondary Indicators | Refinements for Cause | Indicators with no info |
|---|---|---|---|---|---|
| SUPSA82 DISTPLAM | 201005 251430 | 1.00 | server response time: 10.14 [metric:previousRecent:higher:1.00 metric:previousDay:higher:1.00 metric:previousWeek:higher:1.00 metricForPeers:previousRecentForPeers:NotAvailable obs:previousRecent:higher:1.00obs:previousWeek:lower:1.00 metric:currentToBaseline:highPercentChange:1.00] server connect time: 0.00 [metric:previousRecent:lower:1.00metric:previousDay:lower:1.00 metric:previousWeek:lower:1.00 metricForPeers:previousRecentForPeers:NotAvailable obs:previousRecent:higher:1.00obs:previousWeek:lower:1.00 metric:currentToRecent:lowPercentChange:1.00] Server total sessions: 29.00 | Server memory utilization: 36.58 [metric:previousRecent:higher:1.00 metric:previousDay:higher:1.00 metric:previousWeek:lower:1.00 metricForPeers:previousRecentForPeers:NotAvailable obs:previousDay:higher:1.00 obs:previousWeek:higher:0.00 metric:currentToRecent:lowPercentChange:1.00] | server refused sessions server Cpu utilization server Nic utilization |

FIG. 8

PRESENTING DIAGNOSTIC HEADLINES USING SIMPLE LINGUISTIC TERMS

BACKGROUND

The present disclosure relates to interfaces and, in particular, to an apparatus, computer-readable medium, and method for presenting diagnostic headlines in an interface.

SUMMARY

According to an embodiment of the present disclosure, a method is disclosed comprising receiving historical and current performance data from a component of a system. The method further comprising determining an anomaly in the current performance by comparing the current performance data and the historical performance data for the component. The method further comprising determining that the anomaly indicates and error in the system, determining a cause of the anomaly, and determining recommended steps for addressing the cause of the anomaly. The method further comprising formatting for display the current performance data, the error, and the recommended steps for addressing the cause of the anomaly.

According to another embodiment of the present disclosure, a computer configured to access a storage device, the computer comprising a processor, and a non-transitory, computer-readable storage medium storing computer-readable instructions that when executed by the processor cause the computer to perform the aforementioned method.

According to another embodiment of the present disclosure, a computer program product comprising a computer-readable storage medium having computer-readable program code embodied therewith, the computer-readable program comprising computer-readable program code configured to perform the aforementioned method.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-9, like numerals being used for corresponding parts in the various drawings.

FIG. 3 is a schematic depiction of a relationship between observations and trends of components in accordance with a non-limiting embodiment of the present disclosure.

FIG. 5 illustrates a diagnostic report containing ranked conclusions in a non-limiting embodiment of the present disclosure.

FIG. 8 illustrates a diagnostic report containing a server incident report in a non-limiting embodiment of the present disclosure.

DETAILED DESCRIPTION

Figure 1:
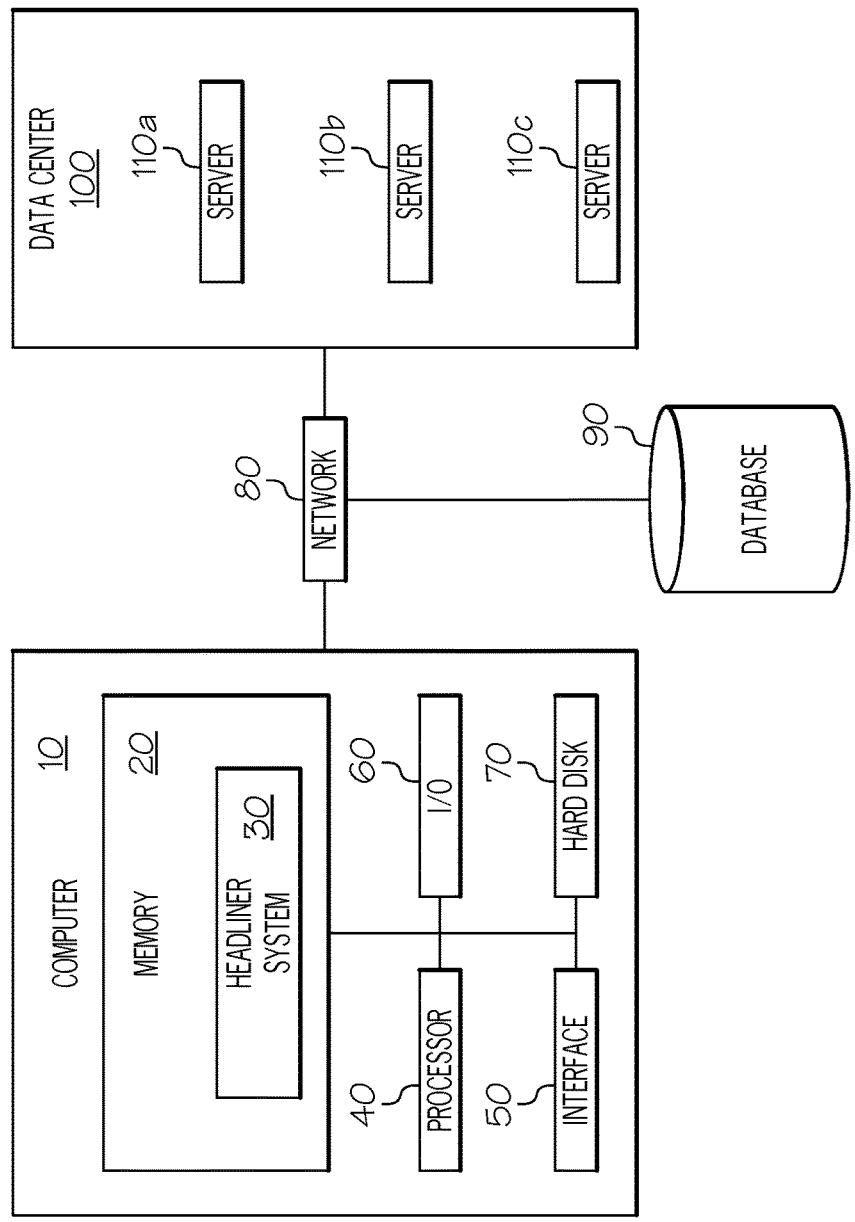
FIG. 1 illustrates a headliner system ecosystem in a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The goal of anomaly detection is to discover patterns in system data that do not conform to expected system behavior. Anomalies in the system data often translate to significant issues in the system. For example, an increase in the utilization of a server system may indicate a virus mining server resources for sensitive information However, the present anomaly detection systems do not go beyond an alarm system for an anomaly. Clients may be aware of an anomaly, but they may not actually understand the underlying issues. These systems fail provide a diagnosis or submit an action plan to the client for swift resolution of the system issue. Moreover, customers often lack the knowledge to bridge the gap between an anomaly alert and an appropriate resolution.

Accordingly, there is a need in the marketplace for a client-friendly anomaly detection system that improves usability and efficiency by providing the necessary decision support and focused problem solving. The present disclosure describes a system that intuitively illustrates system performance and provides a recommended course of action for resolving issues unearthed by system anomalies. The headliner system is a multi-source analysis engine, driven by structured domain models that provides graph based encoding of domain knowledge. In other words, this system receives data from several sources, refines the data, and produces actionable knowledge for the client. The headliner system may analyze several data sources in comparison with a device of interest to determine an anomaly. The headliner system summarizes information about the device of interest and determines a ranked set of probable causes addressing the anomaly. Furthermore, the headliner system determines recommended steps or actions to resolve any system issues arising from anomaly detection.

From an efficiency standpoint, the current disclosure provides an effective solution by empowering the client to resolve system issues by bridging the knowledge gap between an anomaly alert and an action plan. Embodiments of the present disclosure can address the above problems, and other problems, individually and collectively.

FIG. 1 illustrates a headliner system ecosystem in a non-limiting embodiment of the present disclosure. The headliner system ecosystem may include a computer 10, a memory 20, a headliner system 30, a processor 40, an interface 50, an input and output ("I/O") device 60, and a hard disk 70. Headliner system 30 analysis may take place on the computer 10 shown in FIG. 1. Processor 40 may be operable to load instructions from hard disk 70 into memory 20 and execute those instructions. Memory 20 may store computer-readable instructions that may instruct the computer 10 to perform certain processes. I/O device 60 may receive one or more of data from a server or a network 80.

Network 80 may comprise one or more entities, which may be public, private, or community based. Network 80 may permit the exchange of information and services among users/entities that are connected to such network 5. In certain configurations, network 80 may be a local area network, such as an intranet. Further, network 80 may be a closed, private network/cloud, in certain configurations, and an open network/cloud in other configurations. Network 80 may facilitate wired or wireless communications of information and provisioning of services among users that are connected to network 80.

The headliner system ecosystem may also include a data center 100 which may include, for example, servers 110a, 110b, and 110c. The headliner system 30 may receive primary and secondary indicators of the servers 110a, 110b, and 110c. The headliner system 30 may also store historical performance of these servers on a database 90. Furthermore, the headliner system 30 may store any analysis, comments, headlines, or any data on the database 90. The headliner system 30 may also refer to the database for an appropriate headliner for server analysis, such as, for example, comparing current recommended steps to prior recommended steps.

By making this comparison, the headliner system 30 is able to determine if the current data analysis is similar to prior data analysis.

Figure 2:
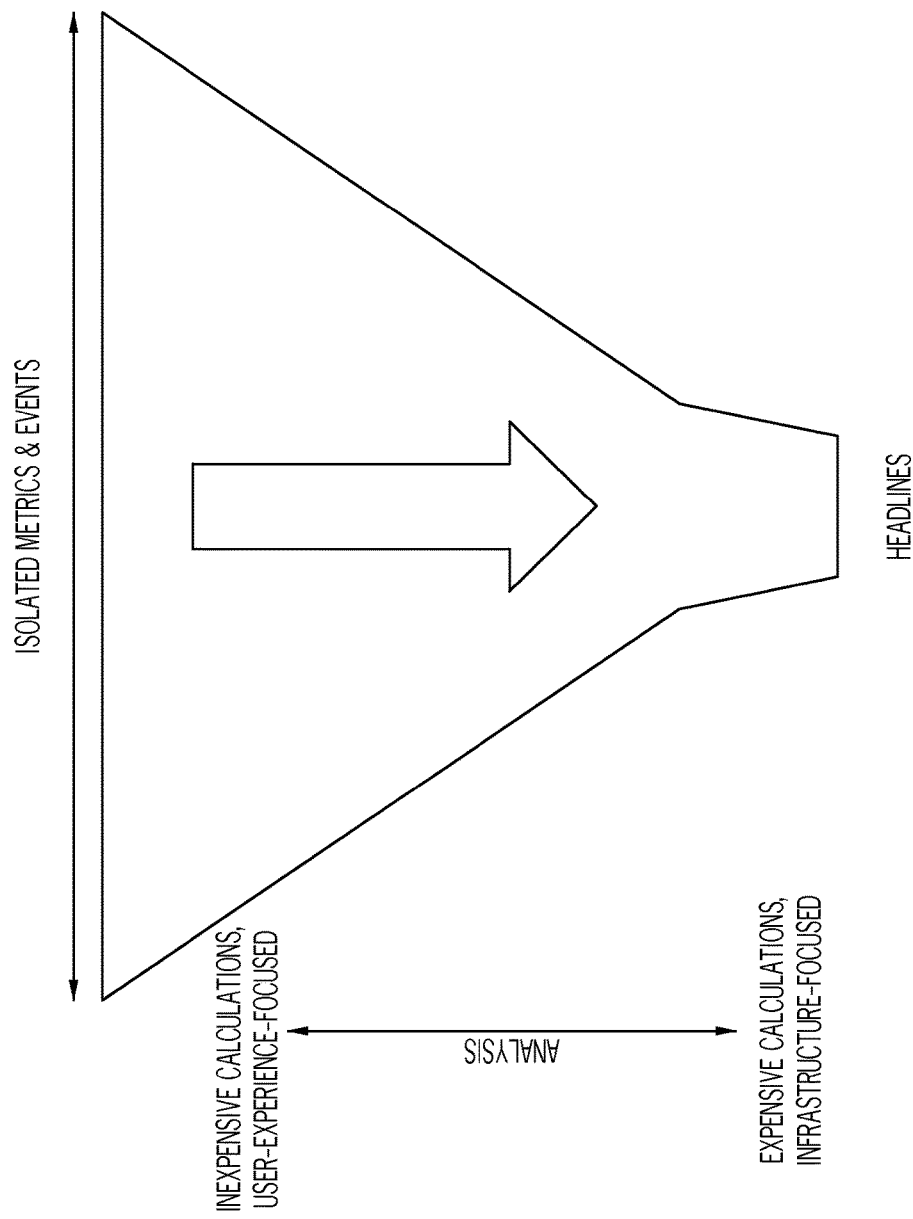
FIG. 2 is a schematic representation of a general overview of a non-limiting embodiment of the present disclosure.

FIG. 2 is a schematic representation of a general overview of a non-limiting embodiment of the present disclosure. The present disclosure describes a headliner system 30 to improve communication between, for example, the underlying computer system and a technical associate of a client. FIG. 2 is an illustration depicting the overall strategy of the headliner system 30. The headliner system 30 analyzes isolated metrics and events within the system. The headliner system 30 may complete numerous inexpensive calculations regarding the user-experience of the system. Furthermore, the headliner system 30 may determine from these inexpensive calculations which infrastructure-focused calculations are required. The headliner system 30 may communicate a diagnostic report of status of the system in simple linguistics or natural language, referred to as headlines.

The gathered information may be transformed into a set of assertions about the device of interest. The headliner system 30 may then draw conclusions given the data and the context. For example, when a mail server's response time is found to be highly degraded, an alert notifies the system administrator. The headliner system 30 notices that the mail server's performance utilization is much higher than yesterday, but similar to last week. The headliner system 30 also notices that the mail server's session count is moderately high, higher than yesterday, but still similar to last week. The headliner system 30 may then provide a headline for the system administrator stating that the mail server is having a weekly surge in activity that is degrading its responsiveness. Next, the headliner system 30 may provide a recommendation stating that the system administrator should consider updating if this surge is business critical. Furthermore, given a set of conditions and analysis results, the headlines provided may be more detailed. Based on the given set of conditions and analysis results, a headline may state that the mail server is overloaded due to a lack of memory resources. Thus, the headliner system 30 provides the client with a directly actionable result in natural language.

FIG. 3 is a schematic depiction of a relationship between observations and trends of components in accordance with a non-limiting embodiment of the present disclosure. The observations of primary and secondary indicators illustrate current usage of certain components of the system. For example, primary indicators such as server response time and connection setup time may be slowed by an increase in the number of sessions and requests (where session counts and session requests are secondary indicators for servers). In such a case, the server may be overtaxed and have difficulty responding to new session requests. If the trend is downward, the system may be bogged down due to high network usage. Additional secondary indicators for servers may include network connection time and data transfer response time. Secondary indicators may be based on network performance and condition. When demonstrating stress in the system, secondary indicators may indicate impact on the users accessing the server based on network conditions. The headliner system 30 relies on secondary indicators to refine its analysis of a computer system. Furthermore, the headliner system 30 may make assertions about secondary indicators and also about peers (e.g., other servers in a farm, other networks in a subnet, etc.).

Figure 4:
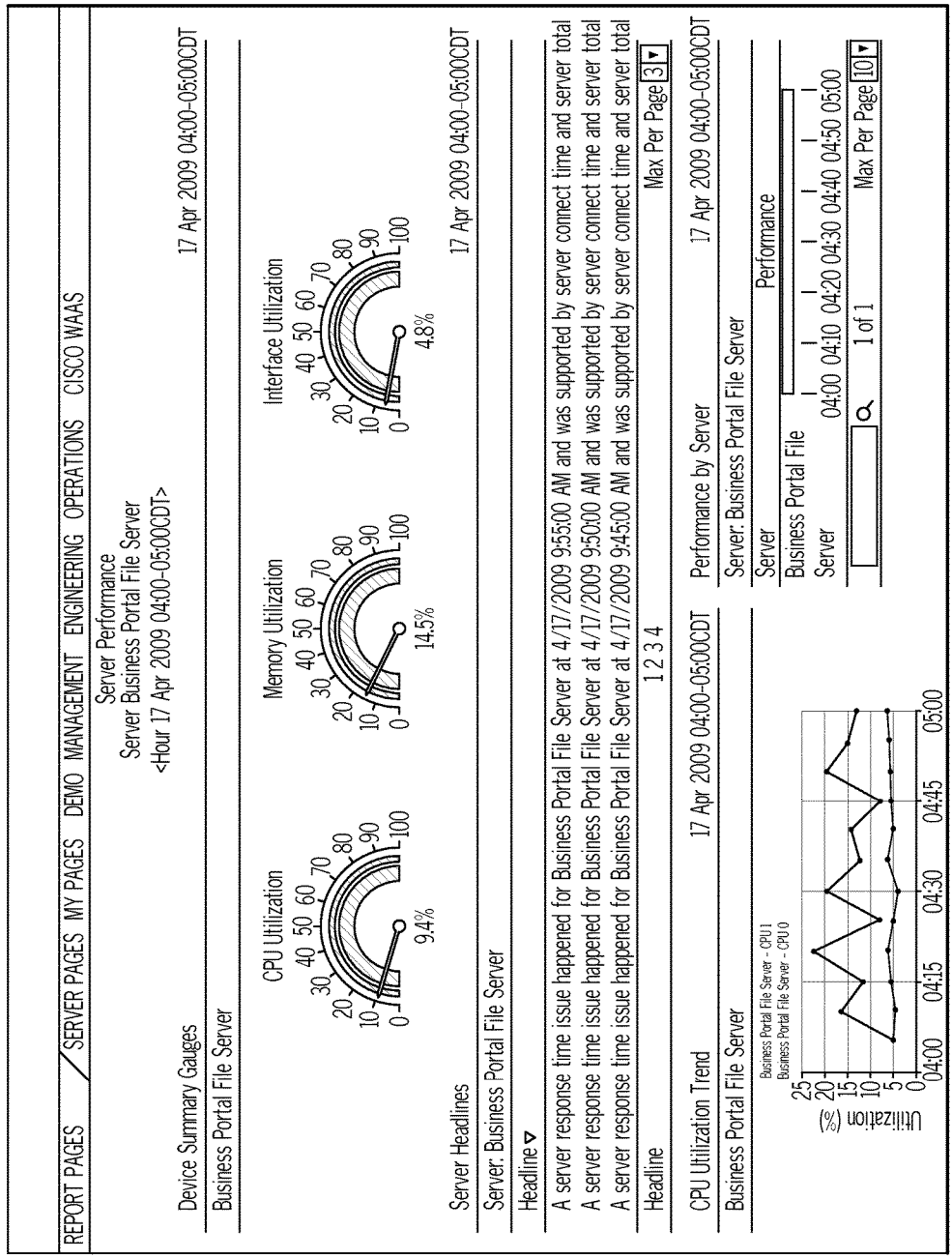
FIG. 4 illustrates a diagnostic report interface in accordance with a non-limiting embodiment of the present disclosure.

FIG. 4 illustrates a diagnostic report interface in accordance with a non-limiting embodiment of the present disclosure. The diagnostic report interface includes device summary gauges analyzing CPU utilization, memory utilization, and interface utilization. The diagnostic report interface is meant to be intuitive and clear. The diagnostic report interface also includes headliners describing in simplistic language abnormalities that may require the client's attention. The diagnostic report interface also depicts the percentage of CPU utilization versus time. With this interface, the client is better able to monitor a server's performance in real-time and address issues should they arise.

FIG. 5 illustrates a diagnostic report containing ranked conclusions in a non-limiting embodiment of the present disclosure. The headliner system 30 may determine an anomaly indicating an error in the system. This determination may be a result of analyzing several sources of data. One source of data may be the historical performance of all components of the server. The headliner system 30 may also compare the current performance of the present system with an analogous peer system. The headliner system 30 may store historical performance data and peer performance data in a database or network/cloud.

By analyzing past and peer performance data, the headliner system 30 is able to determine an average range of performance for components of the server. With high and low performance thresholds, the headliner system 30 is able to analyze a server system to determine if a spike in utilization or performance is commonplace or anomalous. Using the comment/suggestion system, the headliner system 30 can adapt to the system context of clients. In other words, the headliner system 30 may examine the performance behaviors of a client's system to determine if system performance is an anomaly in a certain context.

For example, the headliner system 30 may see a spike in utilization on the fifteenth of every month. If the utilization is significant, such as, for example, above the average threshold, the headliner system 30 would report a headline to the client indicating the server performance, the cause, and ranked conclusions. The client may then add a comment to indicate that on the fifteenth of every month, the client completes payroll. Once the headliner system 30 is updated, the headliner system 30 may incorporate the suggestion and adapt the system such that the next time the server increases utilization on fifteenth of next month, the headliner system 30 considers it as non-anomalous, or average. In other words, the client's comments may be incorporated into the headliner system 30 in order to adjust the thresholds for anomalous behavior.

In addition to past performance data of the system at issue, the headliner system 30 may examine diagnostic settings of the system. The headliner system 30 may determine whether there is a sole server or if there is an array of servers in the system. Additionally, the headliner system 30 may examine data from peer systems comprising analogous components. By doing so, the headliner system 30 can determine in a more holistic manner whether an anomaly indicates a system issue. Furthermore, the headliner system 30 has an object structure instead of compiled code. As a result, the headliner system 30 can be extended by specialization or with additional metrics and attributes.

In some configurations, the quantification methods of the headliner system 30 may avoid crisp thresholds. Network behavior may not change significantly from one integer to the next. To account for this reality, the headliner system 30 may use quantification methods incorporating fuzzy logic. Fuzzy logic is a form of many-valued logic that deals with approximate, rather than fixed and exact reasoning. Using fuzzy logic, the headliner system 30 is equipped to handle the concept of partial truth or partial degradation of a system.

Each headline is also ranked according to likelihood, with the most probable explanation at the top. Client feedback may also be taken into account by the headliner system 30 to adapt the headlines to increase accuracy. For example, the client may indicate that a certain headliner is inaccurate. The headliner system 30 may incorporate the client's feedback into its analysis and ranking of recommended solutions. All feedback may be stored in a database 90 accessible by the headliner system 30. Feedback may also be tagged to the recommended conclusion so the headliner system 30 can adapt according to the client's suggestions. The 'add comment' shown in FIG. 5 is a non-limiting embodiment of the present disclosure. Feedback may occur in a 'thumbs up' and 'thumbs down' format to indicate accuracy or preference of the headlines. Feedback may be in any suitable manner.

Figure 6:
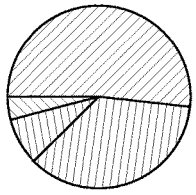
FIG. 6 illustrates a diagnostic report containing correlated anomalies in a non-limiting embodiment of the present disclosure.

FIG. 6 illustrates a diagnostic report containing correlated anomalies in a non-limiting embodiment of the present disclosure. This report provides the client with a wide view of their system by indicating enterprise-wide anomalies. The information provided in the diagnostic report empowers the client to see patterns in anomalies across the whole system. Furthermore, the headliners may describe the anomalies in a simple manner with a probable cause and a recommendation to resolve the issue. Additional support may also be provided to work with the client to both understand the system and taper the system to the client's needs.

Figure 7:
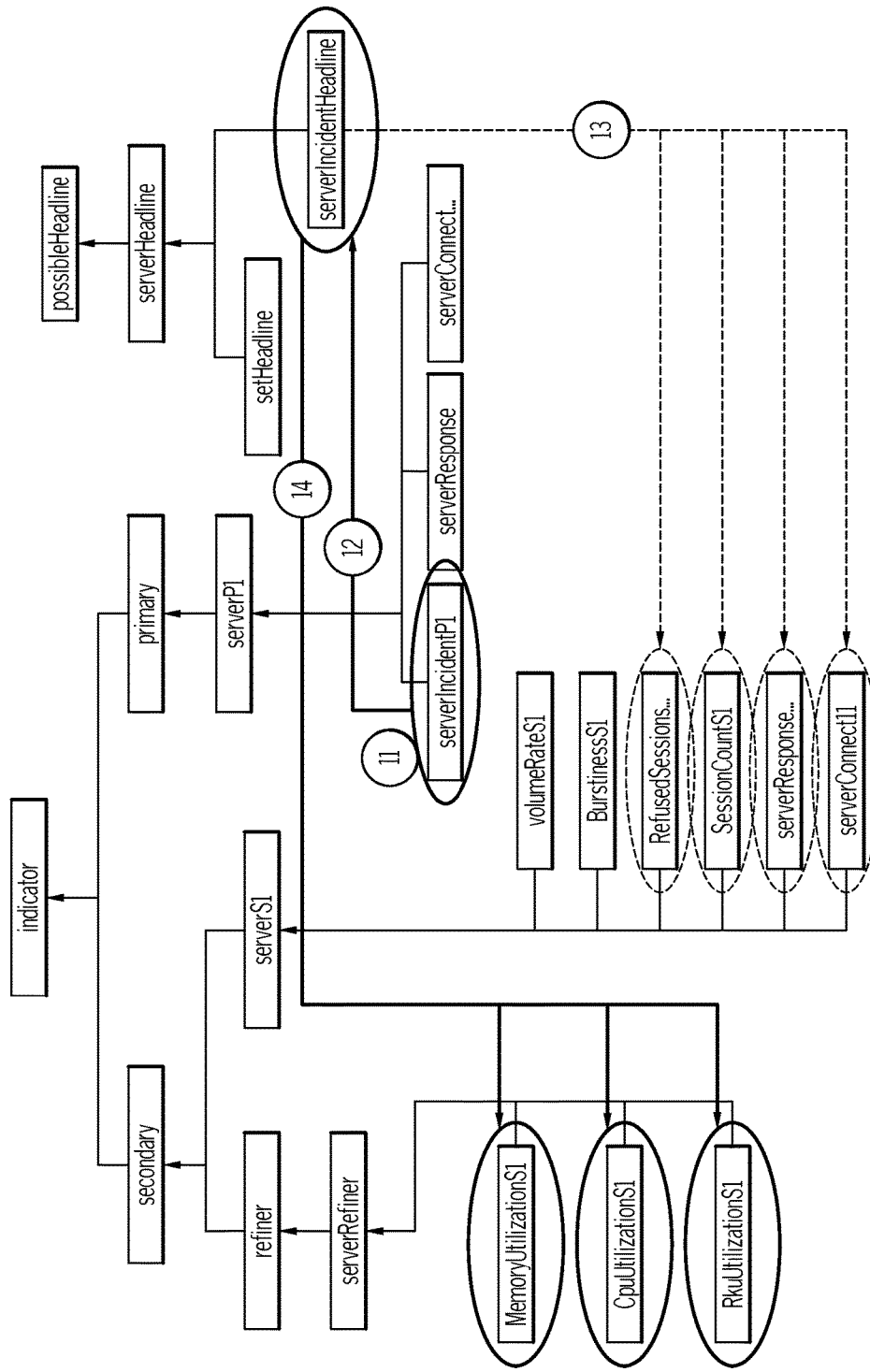
FIG. 7 illustrates a headliner server domain model in a non-limiting embodiment of the present disclosure.

FIG. 7 illustrates a headliner server domain model in a non-limiting embodiment of the present disclosure. In the domain model there are several indicators the headliner system 30 takes into account during processing probable causes of anomalies. Gauges 11 and 12 may act as a trigger to alert the headliner system 30 that there is an anomaly. When the headliner system 30 receives an alert, the system seeks out data from primary (gauge 14) and secondary (gauge 13) indicators to analyze the situation. After collecting data from the primary and secondary indicators relative to the problem, the headliner system 30 may continue with historical and peer comparisons before presenting a diagnosis in the form of a headliner.

FIG. 8 illustrates a diagnostic report containing a server incident report in a non-limiting embodiment of the present disclosure. FIG. 8 illustrates how the headliner system 30 may react when some indicators are unavailable. The headline may specify that the indicators provided no data. Furthermore, the headline details for the server may indicate secondary indicators and the indicators that provided no information.

Figure 9:
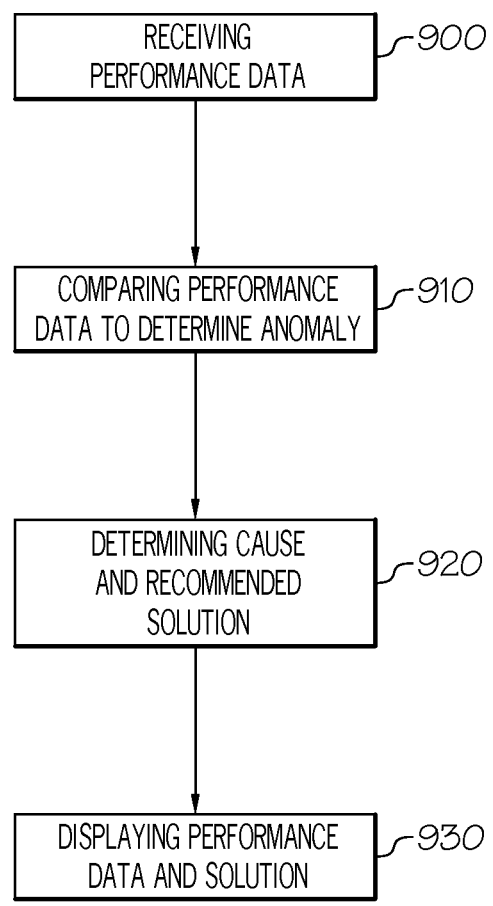
FIG. 9 illustrates a flow diagram depicting the process of a headliner system in a non-limiting embodiment of the present disclosure.

FIG. 9 illustrates a flow diagram depicting the process of a headliner system 30 in a non-limiting embodiment of the present disclosure. In step 900, the headliner system 30 receives historical and current performance data for a component of a system. The headliner system 30 may also receive peer performance data for an analogous component in a peer system. In step 910, the headliner system 30 compares the current performance data to historical performance data, and possibly peer performance data, to determine an anomaly in the current performance of the system. In step 920, the headliner system 30 then may determine the cause of the anomaly, whether the anomaly indicates an error in the system, and further recommend a solution for addressing the situation. In step 930, the headliner system 30 may display performance data and the recommended solution in an intuitive manner.

In some configurations, the headliner system 30 may provide decision support for clientele. Decision support may assist the client in adapting the headliner system 30 to his or her specific needs. Decision support may be live, automated, or a combination thereof.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:
1. A method, comprising:
receiving historical and current performance data for a component of a client system;
based on the historical data, determining an average range of performance and a threshold associated with the average range of performance;
determining an anomaly in the current performance data in response to determining that the current performance data exceeds the threshold associated with the average range of performance;

determining that the anomaly indicates an error in the client system;
determining a cause of the anomaly;
determining a plurality of recommendations for addressing the cause of the anomaly, each recommendation indicating the cause of the anomaly and a solution, wherein determining the plurality of recommendations comprises transforming current performance data into natural language;
providing a diagnostic report interface displaying a diagnostic report identifying the current performance data, the error, and the plurality of recommendations for addressing the cause of the anomaly, wherein the plurality of recommendations are respectively ranked according to likelihood of resolving the anomaly;
receiving user input from the user interface, the user input comprising feedback regarding the plurality of recommendations for addressing the cause of the anomaly;
based on the user input comprising the feedback, determining a client-specific context regarding the anomaly and adjusting the threshold associated with the average range of performance to provide adaptability of the threshold to performance behaviors of the client system in the client-specific context; and
adjusting the ranking of the plurality of recommendations according to the feedback.

2. The method of claim 1, wherein determining the anomaly in the component's performance further comprises:
receiving peer performance data for an analogous component in a peer system;
comparing the current performance data for the component and the peer performance data for the analogous component.

3. The method of claim 1, wherein determining that the anomaly indicates an error in the system further comprises:
receiving input regarding client-specific context of the current performance data;
adjusting the ranking of the plurality of recommendations according to the client-specific context.

4. The method of claim 1, further comprising:
ranking the plurality of recommendations with the most probable explanation for the anomaly on top.

5. The method of claim 1, wherein determining the anomaly in the component's performance further comprises:
comparing prior recommendations in a database to the plurality of recommendations for addressing the cause of the anomaly.

6. The method of claim 1, further comprising:
implementing in the system the plurality recommendations for addressing the cause of the anomaly.

7. A computer configured to access a storage device, the computer comprising:
a processor; and
a non-transitory, computer-readable storage medium storing computer-readable instructions that when executed by the processor cause the computer to perform:
receiving historical and current performance data for a component of a client system;
based on the historical data, determining an average range of performance and a threshold associated with the average range of performance;
determining an anomaly in the current performance data in response to determining that the current performance data exceeds the threshold associated with the average range of performance;
determining that the anomaly indicates an error in the client system;
determining a cause of the anomaly;
determining a plurality of recommendations for addressing the cause of the anomaly, each recommendation indicating the cause of the anomaly and a solution, wherein determining the plurality of recommendations comprises transforming current performance data into natural language;
providing a diagnostic report interface displaying a diagnostic report identifying the current performance data, the error, and the plurality of recommendations for addressing the cause of the anomaly, wherein the plurality of recommendations are respectively ranked according to likelihood of resolving the anomaly;
receiving user input from the user interface, the user input comprising feedback regarding the plurality recommendations for addressing the cause of the anomaly;
based on the user input comprising the feedback, determining a client-specific context regarding the anomaly and adjusting the threshold associated with the average range of performance to provide adaptability of the threshold to performance behaviors of the client system in the client-specific context; and
adjusting the ranking of the plurality of recommendations according to the feedback.

8. The computer of claim 7, wherein determining the anomaly in the component's performance further comprises:
receiving peer performance data for an analogous component in a peer system;
comparing the current performance data for the component and the peer performance data for the analogous component.

9. The computer of claim 7, wherein determining that the anomaly indicates an error in the system further comprises:
receiving input regarding client-specific context of the current performance data;
adjusting the ranking of the plurality of recommendations according to the client-specific context.

10. The computer of claim 7, further comprising:
ranking the plurality of recommendations with the most probably explanation for the anomaly on top.

11. The computer of claim 7, wherein determining the anomaly in the component's performance further comprises:
comparing prior recommendations in a database to the plurality of recommendations for addressing the cause of the anomaly.

12. The computer of claim 7, further comprising:
implementing in the system the plurality of recommendations for addressing the cause of the anomaly.

13. A computer program product comprising:
a non-transitory computer-readable storage medium having computer-readable program code embodied therewith, the computer-readable program code comprising:
computer-readable program code configured to receive historical and current performance data for a component of a client system;
computer-readable program code configured to, based on the historical data, determine an average range of performance and a threshold associated with the average range of performance;
computer-readable program code configured to determine an anomaly in the current performance data in response to determining that the current performance data exceeds the threshold associated with the average range of performance;

computer-readable program code configured to determine that the anomaly indicates an error in the client system;

computer-readable program code configured to determine a cause of the anomaly;

computer-readable program code configured to determine a plurality of recommendations for addressing the cause of the anomaly, each recommended solution indicating the cause of the anomaly and a solution, wherein determining the plurality of recommendations comprises transforming current performance data into natural language;

computer-readable program code configured to providing a diagnostic report interface displaying a diagnostic report identifying the current performance data, the error, and the plurality of recommendations for addressing the cause of the anomaly, wherein the plurality of recommendations are respectively ranked according to likelihood of resolving the anomaly;

computer-readable program code configured to receive user input from the user interface, the user input comprising feedback regarding the plurality of recommendations for addressing the cause of the anomaly;

computer-readable program code configured to determine a client-specific context regarding the anomaly and adjust the threshold associated with the average range of performance based on the user input comprising the feedback to provide adaptability of the threshold to performance behaviors of the client system in the client-specific context; and computer-readable program code configured to adjust the ranking of the plurality of recommendations according to the feedback.

14. The computer program product of claim 13, wherein computer-readable program code configured to determine an anomaly in the current performance further comprises:

computer-readable program code configured to receive peer performance data for an analogous component in a peer system;

computer-readable program code configured to compare the current performance data for the component and the peer performance data for the analogous component.

15. The computer program product of claim 13, wherein computer-readable program code configured to determine that the anomaly indicates an error in the system further comprises:

computer-readable program code configured to receive input regarding the client-specific context of the current performance data;

computer-readable program code configured to adjusting a ranking of the plurality of recommendations according to the client-specific context.

16. The computer program product of claim 13, further comprising:

computer-readable program code configured to rank the plurality of recommendations with the most probably explanation for the anomaly on top.

17. The computer program product of claim 13, further comprising:

computer-readable program code configured to implement in the system the plurality of recommendations for addressing the cause of the anomaly.

* * * * *